Sept. 6, 1927.
J. A. WARREN
1,641,513
SUPPORTING MEANS FOR ELECTRICAL DEVICES
Filed May 6, 1925
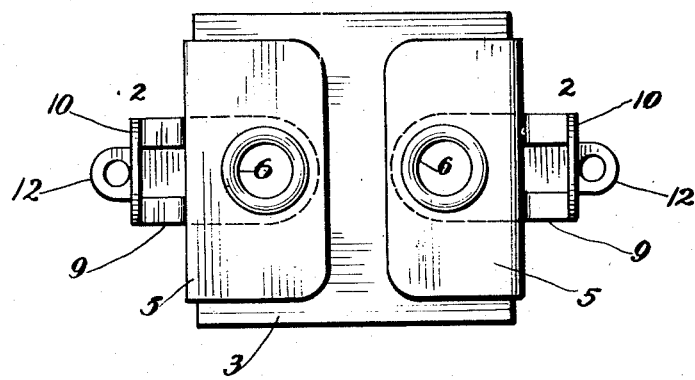
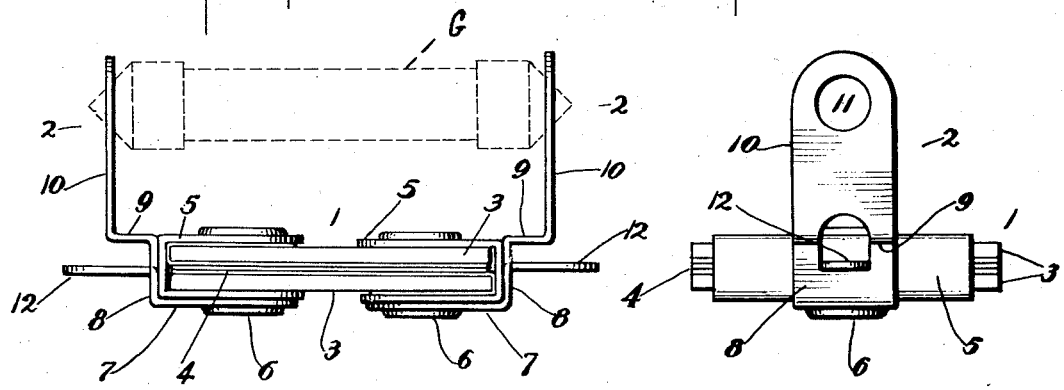
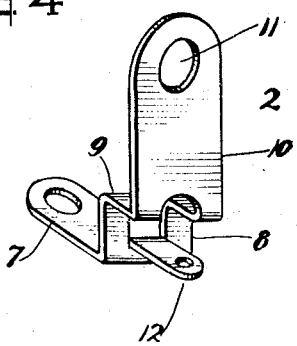
INVENTOR
JOSEPH A. WARREN
BY
Van Deventer + Nickel
ATTORNEYS Patented Sept. 6, 1927.

1,641,513

UNITED STATES PATENT OFFICE.

JOSEPH A. WARREN, OF MOUNT VERNON, NEW YORK, ASSIGNOR TO DUBILIER CONDENSER CORPORATION, OF NEW YORK, N. Y., A CORPORATION OF DELAWARE.

SUPPORTING MEANS FOR ELECTRICAL DEVICES.

Application filed May 6, 1925. Serial No. 28,494.

This invention relates to an improvement in supporting means for electrical devices; particularly supporting means for an electrical resistance.

An object of the invention is to provide a supporting clip to enable a grid leak resistance to be mounted on an electrical condenser of the type employed in connection with radio apparatus; the clip being of such shape as to adapt it for use in carrying a grid leak or connecting the condenser and grid, or the condenser alone, in the radio circuit; or to serve all these purposes.

The nature and scope of the invention will appear from the following description, taken with the accompanying drawings, and the novel features are pointed out in the appended claim. But this disclosure is explanatory only, and I may change the structure actually shown herein, and resort to variations that are fairly embraced within the broad and general meanings of the terms in which the appended claim are expressed.

On the drawings

Figure 1 is a top view of an electrical condenser, bearing a supporting clip according to my invention;

Figure 2 is a side view thereof;

Figure 3 an end view; and

Figure 4 a perspective view of the clip detached.

The same numerals identify the same parts throughout.

An electrical condenser is shown at 1, having a clip 2 attached to each end. This condenser may be of the same kind as set forth in United States Patent No. 1,497,095, granted June 10, 1924. It comprises insulating cover plates 3, between which is a stack 4 of electrically conductive elements or sheets of foil, separated by insulation, such as mica, and the plates and the stack are secured by metallic clamping members 5 and eyelet rivets 6, engaging both ends of the condenser. Part of the sheets of foil are connected to one clamping member, and part to the other, so that, when conductors are united to the members 5, the condenser will be in circuit.

The clips 2 have laterally bent portions or feet 7, perforated so as to be engaged and made fast by the rivets 6. Each portion 7 is held against the face of the adjacent member 5, and each clip is bent across the end of the condenser against the back of the adjacent clamp, as indicated at 8, and at a point flush with the opposite face of the condenser the clip is then bent out and away from the condenser to form a shoulder 9, and then away at right angles to the face of the condenser to provide a grid leak supporting portion or upright shank 10. Each clip has an aperture 11 in its outer end and the part 8 is stamped to cut out a perforated lug 12, to be bent away from the condenser.

The grid leak when needed is mounted on the condenser by moving the ends of the clips, which are resilient, a little apart and inserting the extremities of the grid leak indicated at G in Figure 2, into the apertures 11. The condenser with or without the grid leak is joined in circuit by attaching conductors to the lugs 12.

Having described my invention, what I believe to be new and desire to secure and protect by Letters Patent of the United States is:—

A condenser having a grid leak supporting clip at each end, each clip having a foot secured against one face of the condenser, a shoulder adjacent the opposite face of the condenser, a shank extending from the shoulder, and a connecting lug stamped from a portion of said shank, the shoulder and a portion between said shoulder and the foot and bent outward between the shoulder and the foot.

In testimony whereof I affix my signature.

JOSEPH A. WARREN.